United States Patent
Boyd et al.

(10) Patent No.: US 10,853,942 B1
(45) Date of Patent: Dec. 1, 2020

(54) CAMERA CALIBRATION IN A MOBILE ENVIRONMENT

(71) Applicant: Amazon Technologies, Inc., Seattle, WA (US)

(72) Inventors: Scott Patrick Boyd, Seattle, WA (US); Chengwu Cui, Redmond, WA (US); Barry James O'Brien, Seattle, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/249,821

(22) Filed: Aug. 29, 2016

(51) Int. Cl.
| | | |
|---|---|---|
| *H04N 7/18* | (2006.01) | |
| *G06T 7/00* | (2017.01) | |
| *G06K 9/62* | (2006.01) | |
| *B64C 39/02* | (2006.01) | |
| *B64D 47/08* | (2006.01) | |
| *G05D 1/00* | (2006.01) | |

(52) U.S. Cl.
CPC ............ *G06T 7/002* (2013.01); *B64C 39/024* (2013.01); *B64D 47/08* (2013.01); *G05D 1/0094* (2013.01); *G06K 9/6202* (2013.01)

(58) Field of Classification Search
CPC ............ B64C 39/024; B64C 2201/146; B64C 2201/127; B64C 2201/027; B64C 2201/123; B64C 2201/141; B64C 2201/024; B64C 2201/108
USPC ...................................................... 348/144
See application file for complete search history.

(56) References Cited

U.S. PATENT DOCUMENTS

| | | | | |
|---|---|---|---|---|
| 2011/0216201 A1* | 9/2011 | McAndrew | ............... | G06T 7/80 348/148 |
| 2014/0140575 A1* | 5/2014 | Wolf | .................... | G06K 9/3233 382/103 |
| 2014/0249693 A1* | 9/2014 | Stark | .................... | B64C 39/024 701/2 |
| 2015/0186743 A1* | 7/2015 | Karnos | ................ | G06K 9/4604 382/195 |
| 2015/0227965 A1* | 8/2015 | Drysch | ................... | G06F 16/51 705/14.45 |
| 2016/0073101 A1* | 3/2016 | Keaffaber | ................ | G06T 7/80 348/187 |
| 2016/0313736 A1* | 10/2016 | Schultz | ................... | B64D 47/08 |
| 2016/0334276 A1* | 11/2016 | Pluvinage | ............. | G01J 3/2823 |

(Continued)

*Primary Examiner* — Masum Billah
(74) *Attorney, Agent, or Firm* — Athorus, PLLC (57) ABSTRACT

Camera calibration may be performed in a mobile environment. One or more cameras can be mounted on a mobile vehicle, such as an unmanned aerial vehicle (UAV) or an automobile. Because of the mobility of the vehicle the one or more cameras may be subjected to inaccuracy in imagery caused by various factors, such as environmental factors (e.g., airflow, wind, etc.), impact by other objects (e.g., debris, vehicles, etc.), vehicle vibrations, and the like. To reduce the inaccuracy in imagery, the mobile vehicle can include a mobile camera calibration system configured to calibrate the one or more cameras while the mobile vehicle is traveling along a path. The mobile camera calibration system can cause the one or more cameras to capture an image of an imaging target while moving, and calibrate the one or more cameras based on a comparison between the image and imaging target data.

18 Claims, 6 Drawing Sheets

(56) References Cited

U.S. PATENT DOCUMENTS

2017/0041557 A1* 2/2017 Urich .................... H04N 5/272
2017/0221226 A1    8/2017 Shen et al.
2018/0002017 A1* 1/2018 Abeles .................... B64F 5/60
2018/0046181 A1* 2/2018 Lai ....................... G05D 1/0027

* cited by examiner

CAMERA CALIBRATION IN A MOBILE ENVIRONMENT

BACKGROUND

Camera systems have become important features in many mobile vehicles, both manned and unmanned. For instance, cameras are often used for obstacle avoidance, navigation guidance, and the like. However, due to the mobile environment, the cameras may be subject to distortion, thereby leading to inaccurate imaging information.

Traditionally, to calibrate a camera on a mobile vehicle, the vehicle would have to stop and focus on a known image. However, stopping the vehicle is not always convenient or practical.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides methods, apparatuses, and systems for camera calibration in a mobile environment. In some examples, the cameras can be mounted on a mobile vehicle, such as an unmanned aerial vehicle (UAV). In such examples, the cameras may be subjected to inaccuracy in imagery caused by environmental factors (e.g., ram air, wind, etc.), impact by other objects (e.g., debris, vehicles, etc.), vehicle vibrations, and/or other factors. For example, a UAV with a mounted camera may encounter a strong cross-wind that increases vehicle vibrations enough to affect an image center of the camera image. In such an example, the UAV may include a mobile camera calibration system configured to calibrate the one or more cameras. Camera calibration can include a determination of an error in and an adjustment to an image center, a focal length, a scaling factor, a skew factor, a lens distortion, an image color, an image contrast, and/or other adjustments.

The mobile vehicle can include a mobile camera calibration system configured to calibrate one or more cameras while in a mobile environment. In various examples, the mobile camera calibration system can periodically (e.g., hourly, every 30 minutes, every 5 miles along a route of flight, etc.) and/or intermittently (e.g., when imaging targets are recognized along a route of flight, from time to time, etc.) calibrate the one or more cameras to ensure the cameras remain calibrated. In some examples, the mobile camera calibration system can calibrate a camera based on a determination that the camera is capturing unclear (e.g., blurred and/or otherwise distorted images). However, the mobile camera calibration system may perform calibrations at anytime even without evidence of unclear images, such as in a self-test or validation of camera calibration. The determination can be made by a computing device associated with the mobile camera calibration system and/or the camera itself. The lack of clarity of the images may be caused by intrinsic parameters (e.g., focal length, skew, distortion, image center, etc.) and/or extrinsic factors (e.g., position and/or orientation in the world).

The mobile camera calibration system can be configured to calibrate the camera by causing the camera to capture an image of an imaging target, and comparing the image with stored imaging target data. In various examples, the imaging target data can include one or more reference images of the imaging target captured from particular perspectives (e.g., horizontal and vertical distances, angles, etc.). The imaging target can be a 2-dimensional target and/or a 3-dimensional target. In some examples, the imaging target may be an object itself (e.g., second mobile vehicle, billboard, building), or a portion thereof (e.g., pattern painted on the object, a component of the object as a whole, etc.). For example, the imaging target may be a vertical stabilizer component of a UAV or another component of the UAV.

In various examples, the mobile camera calibration system may be configured to calibrate the camera using an imaging target on a stationary object. In such examples the mobile camera calibration system may determine that the imaging target on the stationary object will be visible to the camera while the mobile vehicle is traveling along a path. For example, the imaging target may be an image visible on a surface of a billboard.

In some examples, the mobile camera calibration system may be configured to calibrate the camera using an imaging target located on another mobile vehicle. In such examples, the mobile camera calibration system may determine that the other mobile vehicle will travel along a second path in proximity to the path of the mobile vehicle, such that the imaging target on the second mobile vehicle will be visible to the camera. Based on the determination that the imaging target is visible to the camera, the mobile camera calibration system may cause the camera to capture an image of the imaging target at a given location along the path. The given location along the path may be pre-programmed prior to the mobile vehicle departing on the path, and/or it may be determined while the vehicle is moving.

The apparatuses, techniques, and systems described herein may be implemented in a number of ways. Though described primarily with reference to UAVs, the mobile camera calibration system is not limited to use with UAVs. Instead, the mobile camera calibration system may be implemented on many other types of flying (e.g., manned aircraft, spacecraft, etc.) and/or non-flying vehicles (e.g., autonomous cars, trucks, tractors, bicycles, etc.), hand-held cameras, and the like. Example implementations of the mobile camera calibration system are provided below with reference to the following figures.

Figure 1:
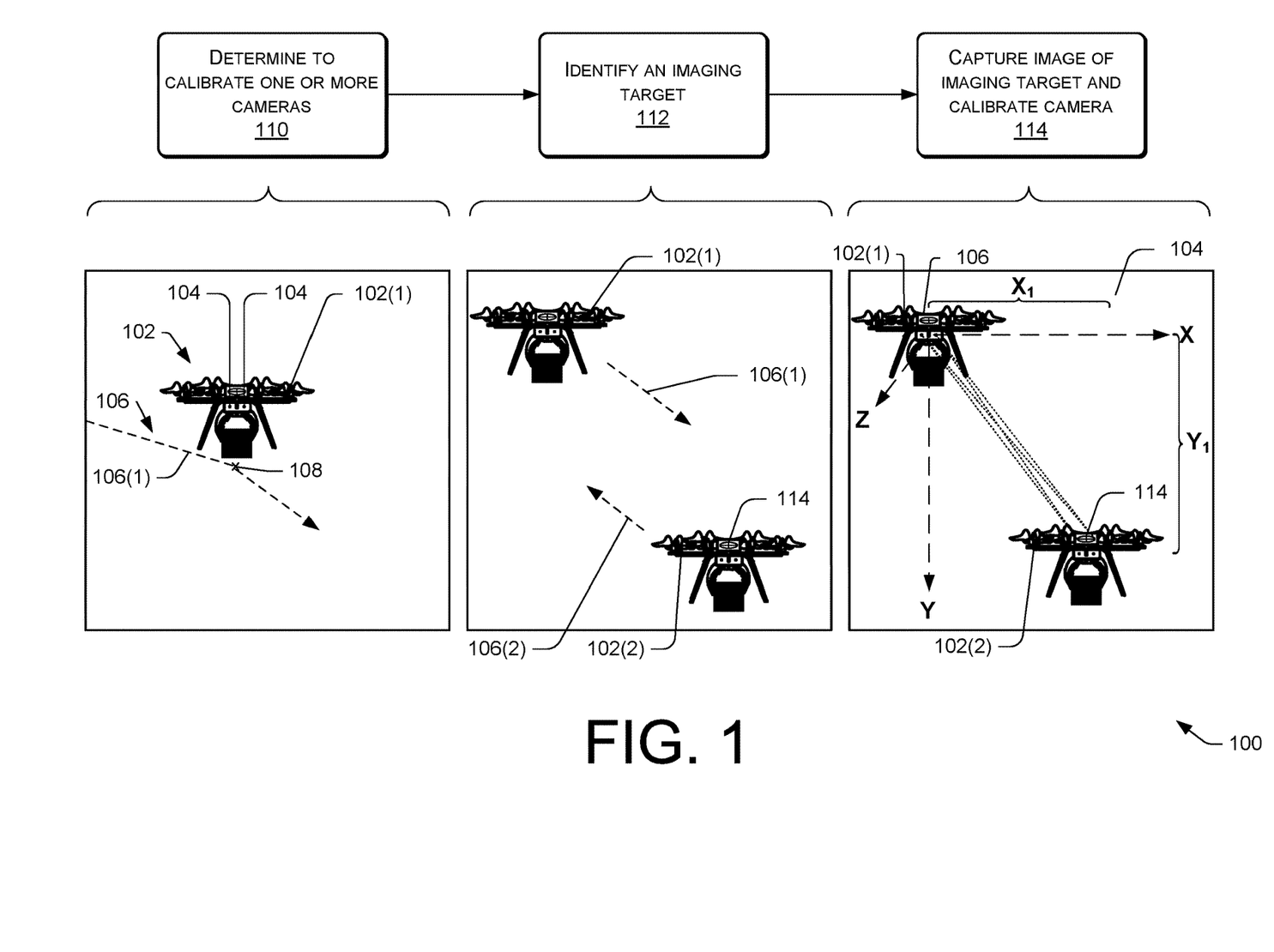
FIG. 1 is a pictorial flow diagram of an example process of a calibration by a mobile camera calibration system.

FIG. 1 is a pictorial flow diagram of an example process 100 of a mobile camera calibration system. As illustrated, a first unmanned aerial vehicle (UAV) 102(1) may include the mobile calibration system configured to calibrate one or more camera(s) 104 in a mobile environment. The one or more camera(s) 104 can include internally mounted cameras, externally mounted cameras, or a combination thereof. In various examples, the one or more camera(s) 104 can be used by one or more computing systems of the UAV 102 for navigation, delivery location identification, obstacle avoidance, and/or for other purposes.

In the illustrative example, the first UAV 102(1) includes a stereo pair of cameras 104. In various examples, the first UAV 102(1) can include a single camera 104 with two or more lenses that operate as a stereo camera. The cameras 104 and/or lenses of a camera operating as a stereo pair can be positioned at a known distance apart from one another and can be configured to capture left-eye and right-eye perspective views of an image. In other examples, the first UAV 102 can include a single lens camera 104, or a network of cameras (e.g., multiple single lens cameras, multiple multi-lens cameras, multiple pairs of cameras, etc.).

In various examples, the first UAV 102(1) can fly a first flight path 106(1). A flight path 106 (e.g., a path of travel of a vehicle) can be defined by a series of waypoints, such as waypoint 108, determined by latitude, longitude, and altitude, a position on a 2-dimensional or 3-dimensional grid system, or a combination thereof. In various examples, the flight path 106 can be a pre-determined set of waypoints, stored locally in a flight management system of a UAV 102. In some examples, the flight path 110 can be adjusted during flight by adding and/or removing waypoints 108. In such examples, a remote operator and/or computing system can send updated waypoints 108 to the flight management system in order to change a flight path 106.

At 110, the first UAV 102(1) may determine to calibrate one or more camera(s) 104. The determination can be made by the mobile camera calibration system, the camera itself, a locally stored computing system, and/or a remote computing system. In various examples, the determination can be based on the one or more camera(s) 104 capturing one or more unclear images. In some examples, the determination can be based on a location of the first UAV 102(1) on the first flight path 106(1) (e.g., at a particular waypoint 108 designated for calibration, at a halfway point to a destination, prior to entering a delivery area, exiting the delivery area, etc.), a duration of flight (e.g., at 10 minute intervals, 30 minutes into a flight, etc.), and/or responsive to contact with another object (e.g., hard landing, contact with debris, contact with obstacle, etc.). In some examples, the determination can be based on an instruction and/or an opportunity to perform a self-test and/or validation of calibration of the one or more camera(s) 104. In yet other examples, the determination can be based on the mobile camera calibration system receiving an error report from the camera indicating a problem with capturing a clear image.

At 112, the first UAV 102(1) can identify an imaging target 114. In various examples, the mobile camera calibration system and/or another computing system of the first UAV 102(1) can identify the imaging target 114. In some examples, a remote computing system can send data regarding the imaging target 114 to the first UAV 102(1). The imaging target 114 can be a 2-dimensional (2D) or 3-dimensional (3D) object, or portion thereof. For example, the imaging target 114 can be a 3D object of known dimensions, such as a 30'×20'×3' billboard, a second UAV, or a portion thereof.

In various examples, the imaging target 114 can be a stationary object (e.g., billboard, building, etc.) or a portion thereof (e.g., image on a billboard, painting on a building, etc.). In such examples, the first UAV 102(1) can determine that the imaging target 114 is located along the first flight path 106(1) and will be visible to the one or more camera(s) 104.

As illustrated in FIG. 1, the imaging target 114 can be located on a second UAV 102(2) (e.g., mobile vehicle). In various examples, the first UAV 102(1) can identify the imaging target 114 based on a relative location of the second UAV 102(2) (e.g., same region, same neighborhood, etc.). In some examples, the first UAV 102(1) can emit a signal to other UAVs 102 in the area and/or to a remote computing device to identify other UAVs 102 with imaging targets. Responsive to sending the signal, the first UAV 102(1) can determine that the second UAV 102(2) is located nearby, and the imaging target 114 located thereon can be used to calibrate the one or more camera(s) 104. In various examples, the first UAV 102(1) and/or the second UAV 102(2) can deviate from respective flight paths 106 to fly nearby one another for camera calibration. In such examples, a decision to deviate may be based on a destination of respective UAVs 102 (e.g., delivery location, recharging station, warehouse facility, etc.), a battery life of respective UAVs 102, a distance of deviation required, a time of deviation required, and/or other factors. For example, a first UAV 102(1) may be flying to a delivery location with a package to deliver, while a second UAV 102(2) may be returning to a warehouse after delivering a package. Because the second UAV 102(2) may be under less of a time constraint to return to the warehouse, the second UAV 102(2) may deviate from the second flight path 106(2) to fly in proximity to the first UAV 102(1) for calibration of the one or more camera(s) 104.

Figure 2:
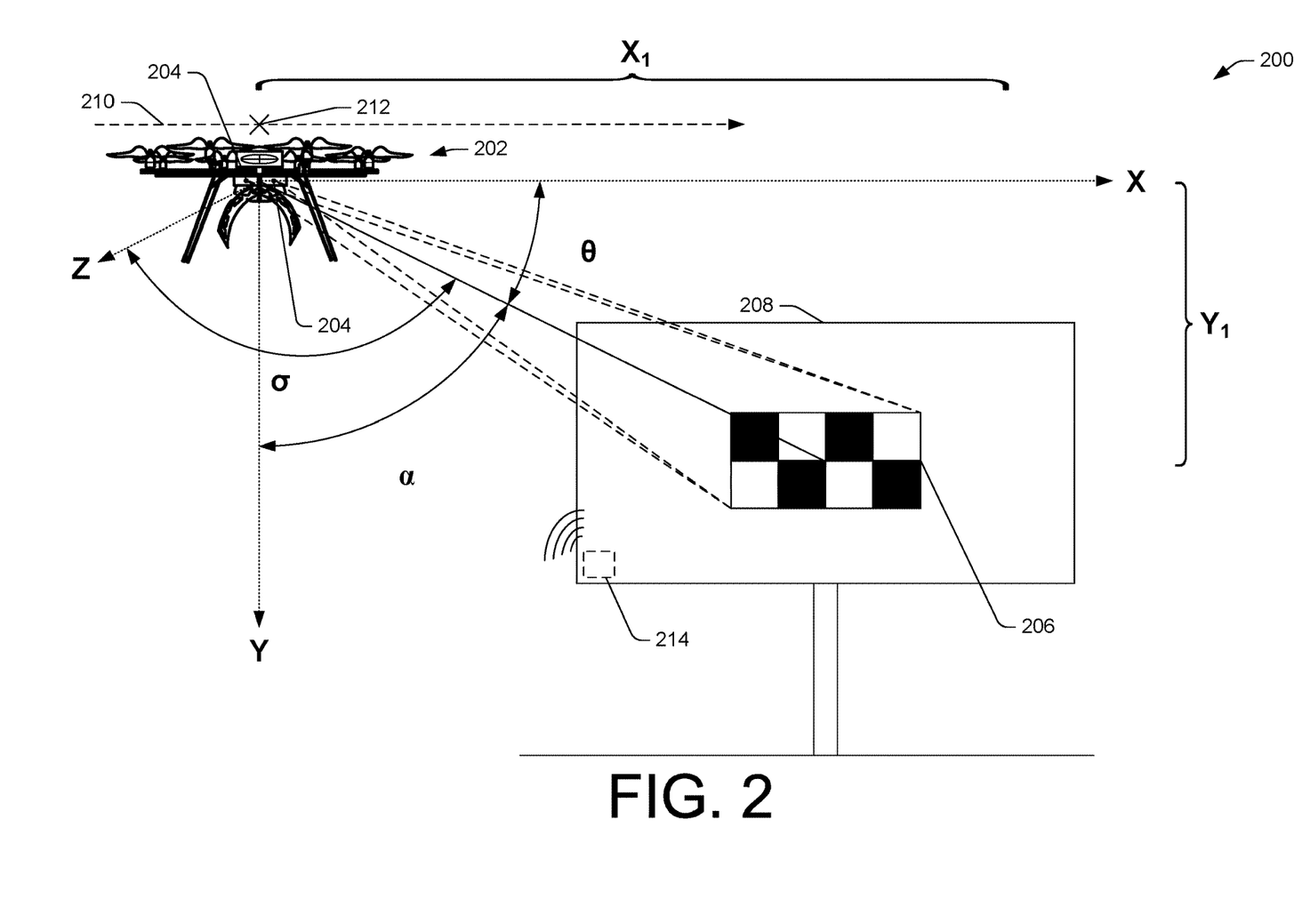
FIG. 2 is a schematic diagram showing an example environment where an unmanned aerial vehicle configured with a mobile camera calibration system may calibrate one or more cameras in a mobile environment using an imaging target on a stationary object.

In some examples, the first UAV 102(1) can identify the imaging target 114 based on the respective flight paths 106 of the first UAV 102(1) and the second UAV 102(2). In such examples, the respective UAVs 102 on the respective flight paths 106 can be determined to pass within a horizontal (X) and (Z) and/or vertical (Y) (axes X, Z, and Y are each oriented at 90 degrees) distance from one another, and/or distances (X), (Z) and/or (Y) and corresponding angles ($\theta$), ($\sigma$), and ($\alpha$) (as shown in FIG. 2). In some examples, the horizontal (X) and/or vertical (Y) distances can be within pre-defined maximum distances (e.g., 30' horizontally and 20' vertically, 20' horizontally and 30' vertically, etc.).

In various examples, the first UAV 102(1) can send a signal to a remote computing system configured to track respective flight paths 106 of the UAVs 102, requesting information on other nearby UAVs 102. In such examples, the remote computing system can identify other UAVs 102 configured with imaging targets 114 that are on flight paths 106 and scheduled to pass in proximity to the first UAV 102(1). The remote computing system can send a response to the first UAV 102(1) including information regarding the second UAV 102(2). The information can include a time the second UAV 102(2) will be in proximity to the first UAV 102(1), horizontal distances X and/or Z and/or corresponding angles at the time, a vertical distance Y and/or corresponding angle at the time, an image of the imaging target, etc.

At 114, the one or more camera(s) 104 on the first UAV 102(1) can capture an image of the imaging target 114 and can calibrate the one or more camera(s) 104 based on the image. In various examples, the one or more camera(s) 104 can capture the image at a pre-determined horizontal distance $X_1/Z_1$ and/or corresponding angles and/or a pre-determined vertical distance $Y_1$ and/or corresponding angle from the imaging target. In some examples, the first UAV 102(1)

can include a distance sensor configured to determine the horizontal distances X and/or Z, and the vertical distance Y and/or corresponding angles (θ), (σ), and (α), between the two UAVs 102. In such examples, based on a determination that the UAVs are at distances $X_1/Z_1$ and $Y_1$, the distance sensor can send a signal to the one or more camera(s) 104 to capture the image.

In various examples, the mobile camera calibration system can compare the image of the imaging target 114 with a reference image of the imaging target. In some examples, the reference image may be from a perspective corresponding to the distances $X_1/Z_1$ and $Y_1$ and/or angles. In some examples, the mobile camera calibration system can adjust a perspective of the reference image based on the distances $X_1/Z_1$ and $Y_1$ and/or the corresponding angles. Based on the comparison between the image and the reference image, the mobile camera calibration system can calibrate the one or more cameras 104. A calibration of the one or more cameras 104 can include an adjustment to an image center, a focal length, a scaling factor, a skew factor, a lens distortion, an image color, an image contrast, and/or other adjustments.

In some examples, the mobile camera calibration system can compare known dimensions of the second UAV 102(2) to the dimensions associated with the captured image, based on the distances $X_1/Z_1$ and $Y_1$ and/or corresponding angles. Based on the comparison, the mobile camera calibration system can calibrate the one or more cameras 104 to ensure images captured by the one or more cameras 104 are accurate.

Additionally or alternatively, a mobile camera calibration system on the second UAV 102(2) may calibrate one or more cameras 104 on the second UAV 102(2) concurrently with the camera calibration on the first UAV 102(1) by capturing an image of an imaging target 114 on the first UAV 102(1) and comparing the image to a reference image of the imaging target 114.

FIG. 2 is a schematic diagram showing an example environment 200 where an unmanned aerial vehicle (UAV) 202, such as UAV 102, configured with a mobile camera calibration system, may calibrate one or more cameras 204, such as the one or more cameras 104, in a mobile environment using an imaging target 206, such as imaging target 114, on a stationary object 208.

The UAV 202 can include various structural and drive components, such as an airframe, one or more rotors, one or more motors, etc. In some examples, the UAV 202 may include a fuselage (e.g., airframe) and two or more fixed wings protruding from the airframe. In such examples, the UAV 202 may also include vertical and/or horizontal stabilizers coupled to the airframe.

The airframe may comprise carbon fiber, titanium, aluminum, plastic, combinations thereof, or any other material appropriate for aircraft construction. In the illustrative example, the UAV 202 is a octo-copter with eight rotors. In some examples, the UAV 202 may comprise a lesser or greater number of rotors, such as, for example, a tri-copter or a quad-copter. In various examples, the UAV 202 may comprise one or more rotors configured to generate substantially horizontal thrust and one or more rotors configured to generate substantially vertical thrust.

In the illustrative example, the UAV 202 includes a motor coupled to and configured to drive each rotor. In some examples, the UAV 202 may comprise a lesser or greater number of motors that are coupled to and configured to drive rotors. For example, the UAV 202 may comprise a single motor coupled to and configured to drive the one or more rotors. In various examples, motors may comprise electrical motors. In such examples, the electric motors may be powered by any reasonable source of electrical power, such as, for example, lithium-ion batteries, fuel cells, solar power, nuclear power, or a hybrid technology. In some examples, the motors may comprise combustion engines.

In the illustrative example, the rotors are the same size and/or shape (e.g. chord, thickness, and/or wingspan). In some examples, the rotors may be different sizes and/or shapes. For example, the rotors on a fore-end of the airframe may have a larger wingspan than the rotors on an aft-end of the airframe, or vice versa. For another example, the rotors configured to generate substantially vertical thrust may be larger than the rotors configured to generate substantially horizontal thrust, or vice versa.

The rotors may comprise a composite material, a wood material, a plastic material, a metallic material, or a combination thereof. In various examples, the rotors may be variable speed, variable pitch rotors. In other examples, the rotors may be variable speed, fixed pitch rotors. In yet other embodiments, the rotors may be fixed speed, variable pitch rotors. Additionally or alternatively, various examples may include one or more of the foregoing rotors used in combination with one or more of a different foregoing rotor, or other propulsion systems.

In various examples, the speed and/or pitch of the rotors may be determined by a computing system based upon input from one or more inertial sensors (e.g., accelerometers, gyroscopes, magnetometers, etc.) and/or positioning sensors (e.g., global positioning sensors, ultrasonic sensors, radar systems, etc.). The inertial sensors may be configured to measure precise positioning data of the UAV 202 along three axes: heading, roll and pitch, and send the positioning data to the computing system. In various examples, the computing system may be a computing system of the mobile camera calibration system or operably connected thereto for data transfer.

In various examples, the computing system can receive flight management input (e.g., input to control direction, velocity, altitude, waypoints, geolocation, etc.) from a remote operator. For example, the remove operator may input changes to a flight path 210, such as flight path 106 (e.g., a path of travel of a vehicle). In some examples, the UAV 202 can be configured to fly autonomously. In such examples, the flight management input can include a flight plan stored locally on the UAV 202 and accessed by the computing system. The flight plan may comprise a series of waypoints determined by a latitude, longitude, and altitude, a position on a 3-dimensional grid system, or a combination thereof. The series of waypoints can determine the flight path 210 of the UAV 202. In some examples, the flight path 210 can be adjusted by the mobile camera calibration system. For example, the mobile camera calibration system can add a waypoint 212 to the flight path 210 based on a location of an imaging target 206.

In various examples, the UAV 202 can travel along a flight path 210. In such examples, while in transit, the UAV 202 can determine to calibrate one or more camera(s) 204. The determination can be made by the mobile camera calibration system, a camera 204, a locally stored computing system, and/or a remote computing system. In some examples, the determination to calibrate the one or more cameras 204 can be based on the one or more camera(s) 204 capturing one or more blurred and/or distorted images. For example, the one or more camera(s) 204 may be configured to capture images along the flight path 210 for navigation purposes. The computing system may be configured to process the images, to ensure the UAV 202 remains on the intended flight path 210 (e.g., is not blown off course). The computing system may process the images and determine that images from a particular camera are blurred and/or otherwise distorted. Based on a determination that the particular camera is capturing unclear images, the computing system can cause the mobile camera calibration system to calibrate the particular camera.

In various examples, the determination to calibrate the one or more camera(s) 204 can be based on an instruction or an opportunity to self-test and/or validate a calibration of the one or more camera(s) 204. In some examples, the determination to calibrate the one or more camera(s) 204 can be based on a location of the UAV 202 on the flight path 210 (e.g., at a particular waypoint 212 designated for calibration, at a halfway point to a destination, prior to entering a delivery area, exiting the delivery area, etc.), a duration of flight (e.g., at 10 minute intervals, 30 minutes into a flight, etc.), and/or responsive to contact with another object (e.g., hard landing, contact with debris, contact with obstacle, etc.).

Based on a determination to calibrate the one or more camera(s) 204, the UAV 202 can identify an imaging target 206. In various examples, the imaging target 206 can include a 2D and/or 3D pattern located on a surface of a stationary and/or mobile object. The pattern can include an image of known dimensions, colors, and/or other qualities. For example, as illustrated in FIG. 2, the pattern can be a checkerboard pattern with alternating black and white rectangles of equal dimensions.

In various examples, data regarding the imaging target 206 can be stored on a data store of the UAV 202. In some examples, data regarding the imaging target 206 can be sent to the UAV 202 via a remote computing device. For example, a remote camera calibration management system may determine that the stationary object 208 is located along a flight path 210 of the UAV 202. Responsive to the determination, the remote camera calibration management system may send information regarding the stationary object 208 and/or the imaging target 206 to the UAV 202 for camera calibration. The information can include dimensions of the stationary object 208 and/or the imaging target 206, an image of the imaging target 206, a horizontal distances X and/or Z and/or corresponding angles (θ) and/or (σ), and/or a vertical distance Y and/or corresponding angle (σ) the flight path will be away from the imaging target 206, a time to capture the image, and/or a waypoint 212 at which to capture the image. Additionally or alternatively, the information associated with the stationary object 208 and/or the imaging target 206, can be transmitted from a transmitter 214 located on the stationary object. In such examples, the transmitter 214 can emit a signal including the information continuously, periodically, and/or when queried by the mobile camera calibration system of the UAV 202. In various examples, the transmitter 214 can emit the signal responsive to a query from the UAV 202, requesting imaging target data.

In various examples, the mobile camera calibration system can cause the one or more camera(s) 204 to capture an image of the imaging target 206 at a designated horizontal distances $X_1$ and/or $Z_1$ (not illustrated) and/or corresponding angles (θ) and/or (σ), and a designated vertical distance $Y_1$ and/or corresponding angle (σ), from the imaging target 206 (e.g., designated camera perspective of the imaging target 206). In some examples, the designated horizontal distances $X_1/Z_1$ and designated vertical distance $Y_1$ and/or corresponding angles (θ), (σ), and/or (α), can be associated with a waypoint 212 designated for image capture. In such examples, the mobile camera calibration system may include a stored image (e.g., reference image) and/or the stored dimensions of the imaging target 206 from the distance $X_1$, $Z_1$, $Y_1$, and/or corresponding angles (θ), (σ), and/or (α) for comparison and calibration. In various examples, the mobile camera calibration system can cause the one or more camera(s) 204 to capture two or more images from different camera perspectives of the imaging target 206, for camera calibration.

At waypoint 212, the one or more cameras 204 can capture an image of the imaging target 206. In various examples, the mobile camera calibration system of the UAV 202 can compare the image to a stored image and/or the stored dimensions of the imaging target 206. Based on the comparison, the mobile camera calibration system can calibrate the one or more cameras 204 of the UAV 202. In some examples, the mobile camera calibration system of the UAV 202 can send the image to a remote computing system for calibration calculations. In such examples, the remote computing system can send instructions to the UAV 202 including calibration parameters for the one or more cameras 204.

In various examples, the mobile camera calibration system of the UAV 202 can use the following calibration principle:

$$\lambda \begin{bmatrix} u \\ v \\ 1 \end{bmatrix} = A[R \mid t] \begin{bmatrix} X^w \\ Y^w \\ Z^w \\ 1 \end{bmatrix}, \quad (1)$$

where λ is a scaling factor for a known position u, v on an imaging target. A is a 3×3 matrix corresponding to intrinsic parameters of a camera (e.g., focal length, optical center, magnification, etc.). The relationship R|t accounts for the camera coordinate system and the real world coordinate system, where R is a rotation matrix to correlate two coordinate systems that have different rotation angles and/or orientation, and t is a translation radial (e.g., component). $(XYZ)^w$ correspond to the world coordinates of the waypoint 212 at which the UAV 202 may capture the image. In some examples, the mobile camera calibration system may use other calibration principles to calibrate the one or more camera(s) 204.

Though FIG. 2 is described with respect to a UAV, as stated above, the use of the mobile camera calibration system as described is not limited to such an application. For example, a mobile camera calibration system and one or more cameras may be included in an autonomous vehicle.

Figure 3:
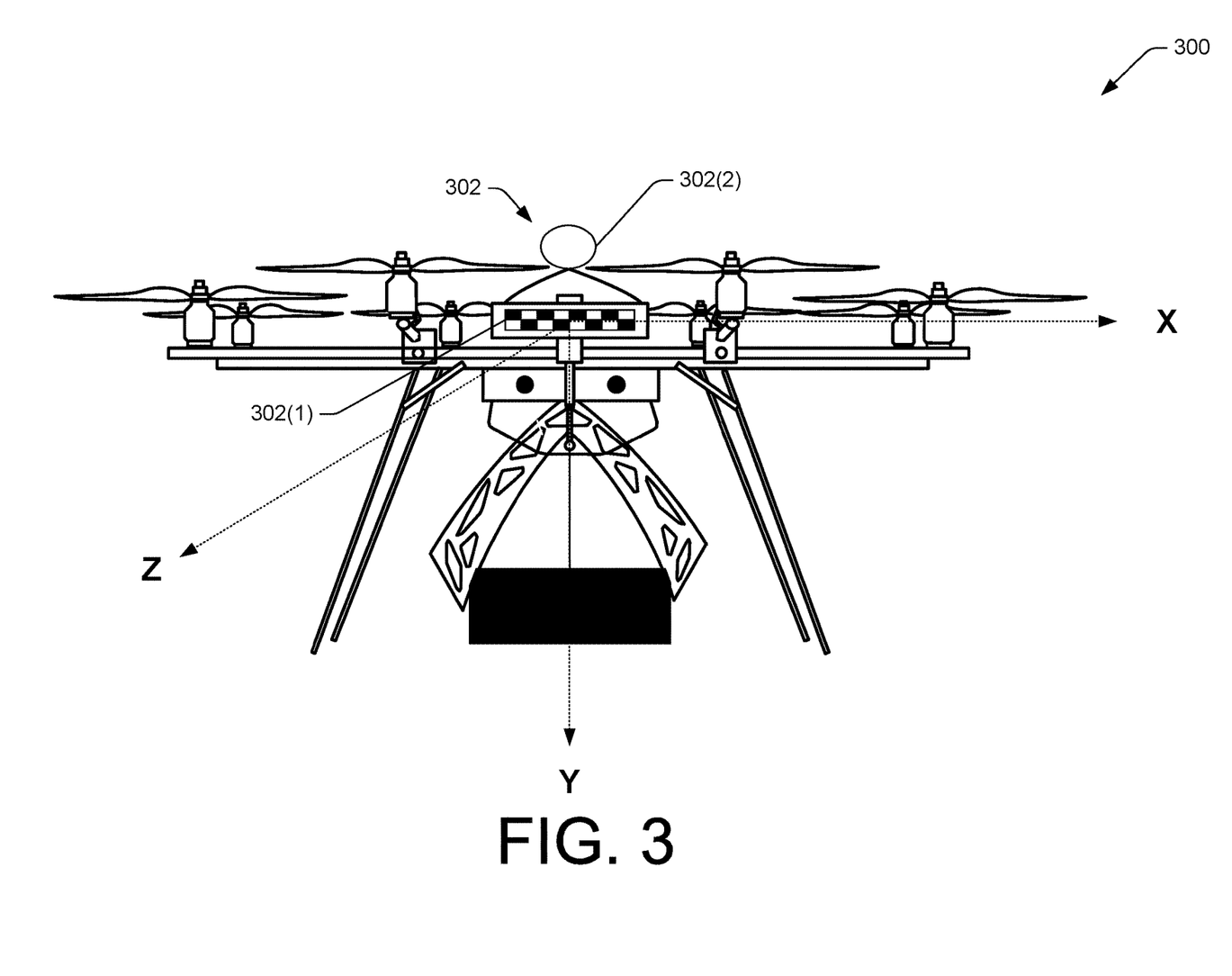
FIG. 3 is a schematic diagram of an example unmanned aerial vehicle configured with 2-dimensional and 3-dimensional imaging targets for use with a mobile camera calibration system.

FIG. 3 is a pictorial diagram of an example unmanned aerial vehicle 300, such as UAV 102 and/or 202, configured with various imaging targets 302 for use with a mobile camera calibration system. In various examples, the imaging target 302 can include the UAV 300 or a portion thereof. In such examples, the mobile camera calibration system may access stored dimensions of the UAV 300, and may be configured to calibrate the camera based on a comparison of the stored dimensions and an image captured at a particular distance $X_1$, $Y_1$, $Z_1$, and/or corresponding angles (θ), (σ), and/or (α), from UAV 300.

In some examples, the UAV 300 can include additional 2D imaging targets 302(1) and/or 3D imaging targets 302(2). The 2D imaging targets 302(1) can include a pattern located on a surface of the UAV 300. In the illustrative example, the pattern includes a checkerboard pattern of known dimensions.

In various examples, the UAV 300 can include additional 3D imaging targets 302(2). In the illustrative example, the 3D imaging target 302(2) is a spherical component of the UAV 300 coupled to an airframe, with known dimensions. In other examples, the 3D imaging target 302(2) can include 3D patterns located on a surface of the UAV 300. In yet other examples, the 3D imaging target 302(2) can include the entire UAV 300. In various examples, the mobile camera calibration system may have stored information regarding the dimensions of the 3D imaging target 302(2).

In various examples, a mobile camera calibration system of a second UAV or mobile vehicle, can capture an image of the imaging target 302 with one or more cameras. Based on the known dimensions and position of the imaging target 302, the mobile camera calibration system can calibrate the one or more cameras using a calibration principle, such as that described above with regard to FIG. 2.

Figure 4:
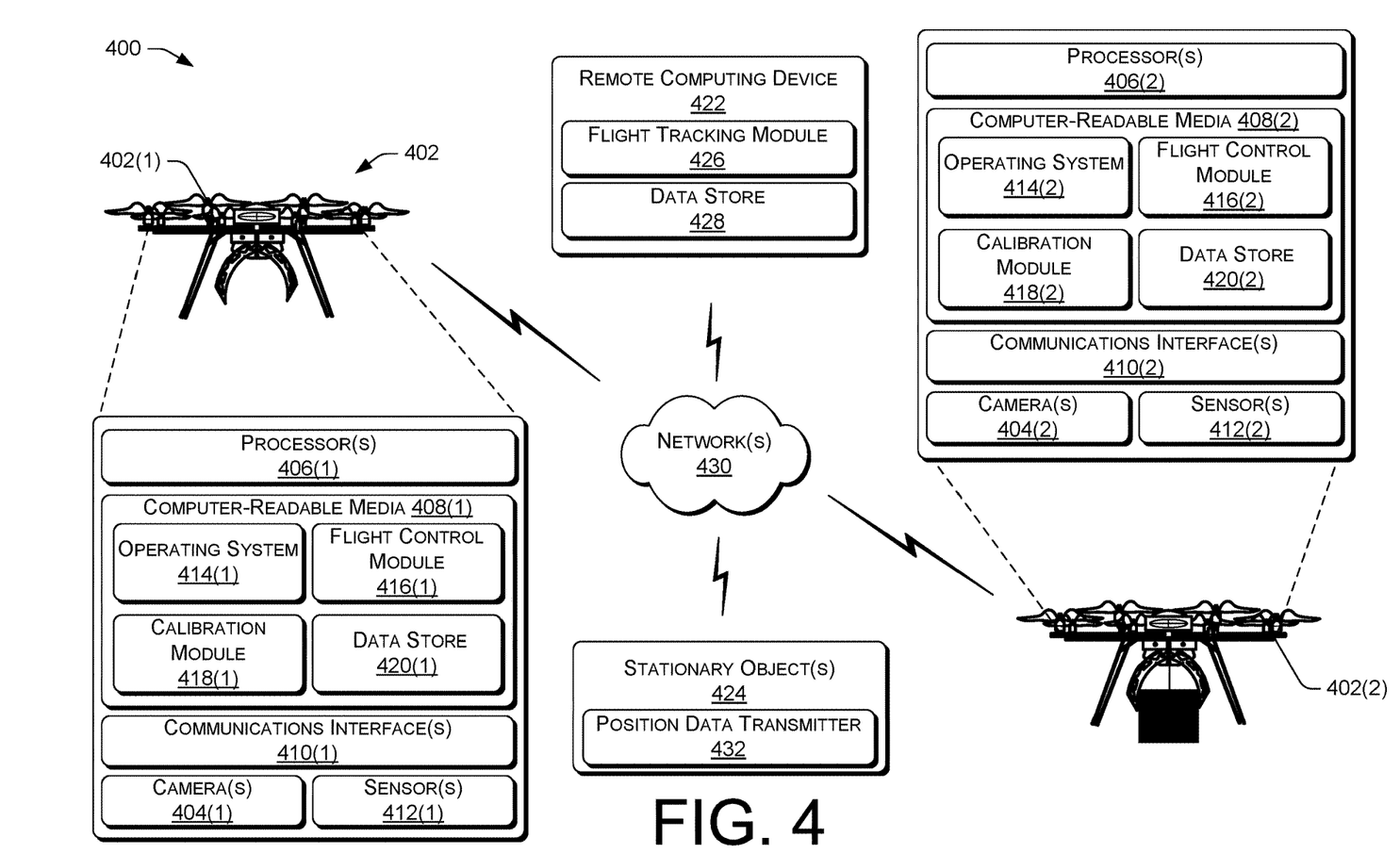
FIG. 4 is a block diagram showing an example environment where illustrated example components of a mobile camera calibration system may be used to calibrate one or more cameras in a mobile environment.

FIG. 4 is a schematic diagram showing an example environment 400 where illustrated example components of UAVs 402 configured with a mobile camera calibration system may calibrate one or more camera(s) 404 in a mobile environment. Although illustrated as unmanned aerial vehicles, UAVs 402 may include any type of manned or unmanned flying and/or non-flying vehicle.

In the illustrated example, the UAVs 402 include at least one processor 406, at least one memory 408, one or more communication interface(s) 410, and one or more sensor(s) 412. Each processor 404 may itself comprise one or more processors or processing cores. For example, the processor 406 can be implemented as one or more microprocessors, microcomputers, microcontrollers, digital signal processors, central processing units, state machines, logic circuitries, and/or any devices that manipulate signals based on operational instructions. In some cases, the processor(s) 406 may be one or more hardware processors and/or logic circuits of any suitable type specifically programmed or configured to execute the algorithms and processes described herein. The processor(s) 406 can be configured to fetch and execute computer-readable processor-executable instructions stored in the memory 408. The processor(s) 406 may be operably coupled to the memory 408 via bus, which in some instances can include one or more of a system bus, a data bus, an address bus, a PCI bus, a Mini-PCI bus, and any variety of local, peripheral and/or independent buses.

The memory 408, illustrated as computer-readable media 408, may include a tangible non-transitory computer storage media and may include volatile and nonvolatile memory and/or removable and non-removable media implemented in any type of technology for storage of information such as computer-readable processor-executable instructions, data structures, program modules or other data. The memory 408 may include, but is not limited to, RAM, ROM, EEPROM, flash memory, solid-state storage, magnetic disk storage, optical storage, and/or other computer-readable media technology.

The memory 408 may be used to store and maintain any number of functional components that are executable by the processor 406. In some implementations, these functional components comprise instructions or programs that are executable by the processor 406 and that, when executed, implement operational logic for performing the actions and services attributed above to the UAV 402. Generally, computer-executable instructions include routines, programs, objects, modules, components, data structures, and the like that perform particular functions or implement particular abstract data types. Functional components of the UAV 402 stored in the memory 408 may include an operating system 414, a flight control module 416, a calibration module 418, and a data store 420. The operating system 414 of the UAV 402 may be any operating system capable of managing computer hardware and software resources.

Additionally or alternatively, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric. In the context of hardware, some or all of the blocks can represent application specific integrated circuits (ASICs) or other physical components that perform the recited operations.

In various examples, the flight control module 416 may include a control management computing system configured to adjust one or more control inputs (e.g., rotor speed, rotor pitch, motor speed, flight control inputs, etc.) necessary to fly a flight path, such as flight path 106, including a plurality of waypoints, such as waypoint 212. The one or more inputs can include maneuvers to connect the waypoints, such as climbs, descents, turns, hovering, take-off, landing, or any other maneuver input from a remote operator and/or as determined by a flight path.

In some examples, the flight control module 416 can be configured to adjust a flight path of the UAV 402. In some examples, the adjustment can be based on a determination to calibrate the one or more cameras 404, and a corresponding identification of an imaging target located off the flight path. In such examples, the flight control module 416 can add and/or remove waypoints to the flight path in order to fly in proximity to the imaging target. For example, the flight control module 416(1) on a first UAV 402(1) may identify an imaging target on a second UAV 402(2). The flight control module 416(1) may determine that the second UAV 402(2) cannot deviate from its flight path due to a delivery time constraint. Based on that determination, the flight control module 416(1) may delete a waypoint on the flight path of the first UAV 402(1), and replace it with an intercepting waypoint of the flight path of the second UAV 402(2). The intercepting waypoint may result in the first UAV 402(1) over-flying the second UAV 402(2), in order to capture images of an imaging target for camera calibration.

In various examples, the calibration module 418 can be configured to calibrate the one or more cameras 404 on the UAV 402. In some examples, the calibration module 418 can determine to calibrate the one or more cameras 404. The determination can be based on a quality and/or clarity of images captured by the one or more cameras, a scheduled calibration, a recognized calibration opportunity (e.g., planned flight in proximity to an imaging target), an instruction to calibrate the one or more cameras from a remote computing device 422, an instruction to validate and/or self-test calibration of the one or more cameras, and the like.

Responsive to a determination to calibrate the one or more cameras 404, the calibration module 418 can identify an imaging target for calibration. In various examples, the imaging target can be a stationary object 424 (e.g., billboard, building, etc.) or a portion thereof (e.g., image on a billboard, painting on a building, etc.). In such examples, the UAV 402 can determine that the imaging target is located along the flight path of the UAV 402, and will be visible to the one or more camera(s) 404.

In various examples, the calibration module 418 can access a list of stationary objects 424 located along the flight path, such as a list stored in the data store 420. In some examples, the calibration module 418 can send a signal via network(s) 430 to a remote computing device 422 requesting data on stationary objects 424. In such examples, the remote computing device 422 can determine, based on flight data of the UAV 402 stored in a flight tracking module 426 and/or stationary object data stored in a data store 428, one or more stationary objects 424 located along the flight path of the UAV 402. In various examples, the remote computing device 422 can be configured to communicate the location data and/or imaging target data of the stationary object 424 via the network(s) 430. The network(s) 430 can include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof.

In various examples, the UAV 402 can include communications interface(s) 410 to facilitate communications via the network(s) 430. In such examples, the one or more communication interface(s) 410 can include a number of devices (e.g., switches, routers, gateways, access points, firewalls, base stations, repeaters, etc.) that facilitate network communications between UAVs 402(1) and 402(2), between the UAV 402 and the remote computing device 422 and/or the stationary object 424. The network communications may include wireless signals such as Bluetooth, radio control, voice control, electromagnetic waves, Wi-Fi signals, cell phone signals, or some combination thereof.

In some examples, the UAV 402 can emit a signal via the network(s) 430 to determine whether one or more stationary objects 424 are in proximity to the UAV 402. In such examples, the one or more stationary objects 424 may receive the signal, and activate a position data transmitter 432, such as transmitter 214, providing location data (e.g., latitude, longitude, altitude, etc.) of the stationary object 424 and/or the imaging target. In some examples, the position data transmitter 432 of the stationary object 424 may emit location data and/or imaging target data continuously and/or at periodic intervals for passing UAVs 402. In various examples, the calibration module 418 may receive the location data and/or the imaging target data from the remote computing device 422 and/or the stationary object 424, and may designate the imaging target on the stationary object 424 as the imaging target for calibration.

In various examples, the imaging target can be a mobile object or a portion thereof (e.g., a pattern located on an airframe, a component coupled to the airframe, a known dimension and/or component of the airframe, etc.). For example, a calibration module 414(1) on a first UAV 402(1) performing a calibration of one or more cameras 404, can determine that a second UAV 402(2) configured with an imaging target is programmed to fly a flight path in proximity to a flight path of the first UAV 402(1). Based on the determination that the UAVs 402(1) and 402(2) will be in proximity to one another, the calibration module 418(1) can calibrate the one or more cameras 404(2) using the imaging target on the second UAV 402(2).

In some examples, the UAV 402 can access a list of mobile objects scheduled to be in proximity to a flight path of the UAV 402. In such examples, the UAV 402 can access mobile object data, such as location data and/or imaging target data for the mobile object, stored in the data store 420. For example, the first UAV 402(1) may access a list of other UAVs 402 within the same region as the first UAV 402(1). The calibration module 418(1) may identify a second UAV 402(2) that is programmed to fly within a threshold distance of the first UAV 402(1). Based on the identification, the calibration module 418(1) can designate an imaging target on the second UAV 402(2) as the imaging target for calibration.

In various examples, the calibration module 418 can program the one or more cameras 404 to face an orientation to view the designated imaging target. In such examples, the calibration module 418 can determine a particular angle and/or distance to capture an image of the imaging target from the respective waypoints of the UAV 402 associated with an image capture. In some examples, the particular angle and/or distance may be based on a reference image of the imaging target in the data store 420, and/or imaging target data received from the remote computing device 422 and/or stationary object 424. In various examples, the calibration module 418 may be configured to cause one or more sensor(s) 412, such as a laser range finder, to determine a distance and/or angle to an imaging target. The one or more sensor(s) 412 may be configured to send the calibration module 418 a signal indicating a position at the particular angle and/or distance to the imaging target for image capture.

In some examples, the calibration module 418 can cause the one or more cameras 404 to capture an image of the imaging target at a particular waypoint. The particular waypoint may be associated with horizontal distances, a vertical distance, and/or corresponding angles between the first UAV 402(1) and the imaging target (e.g., located on a stationary or mobile object). In various examples, the particular waypoint may be a pre-programmed waypoint of the flight path. In such examples, the calibration module 418 may be configured to extract global positioning data from the one or more sensor(s) 412, to identify when the UAV 402 is located at the particular waypoint.

Additionally or alternatively, the calibration module 418 can cause the one or more cameras 404 to capture the image based on an instruction and/or the imaging target data received from the remote computing device 422 and/or stationary object 424. Responsive to capturing the image of the imaging target, the calibration module 418 can calibrate the one or more cameras 404. In various examples, the calibration can be performed by comparing the image of the imaging target with a reference image of the imaging target. In some examples, the calibration can be performed by comparing the image with known dimensions and/or data regarding the imaging target.

In various examples, the UAV 402 can include one or more sensor(s) 412 to facilitate camera calibration. In such examples, the one or more sensor(s) 412 can include a laser range finder, LIDAR, global positioning system, and other sensors capable of providing distance and/or location information.

Figure 5:
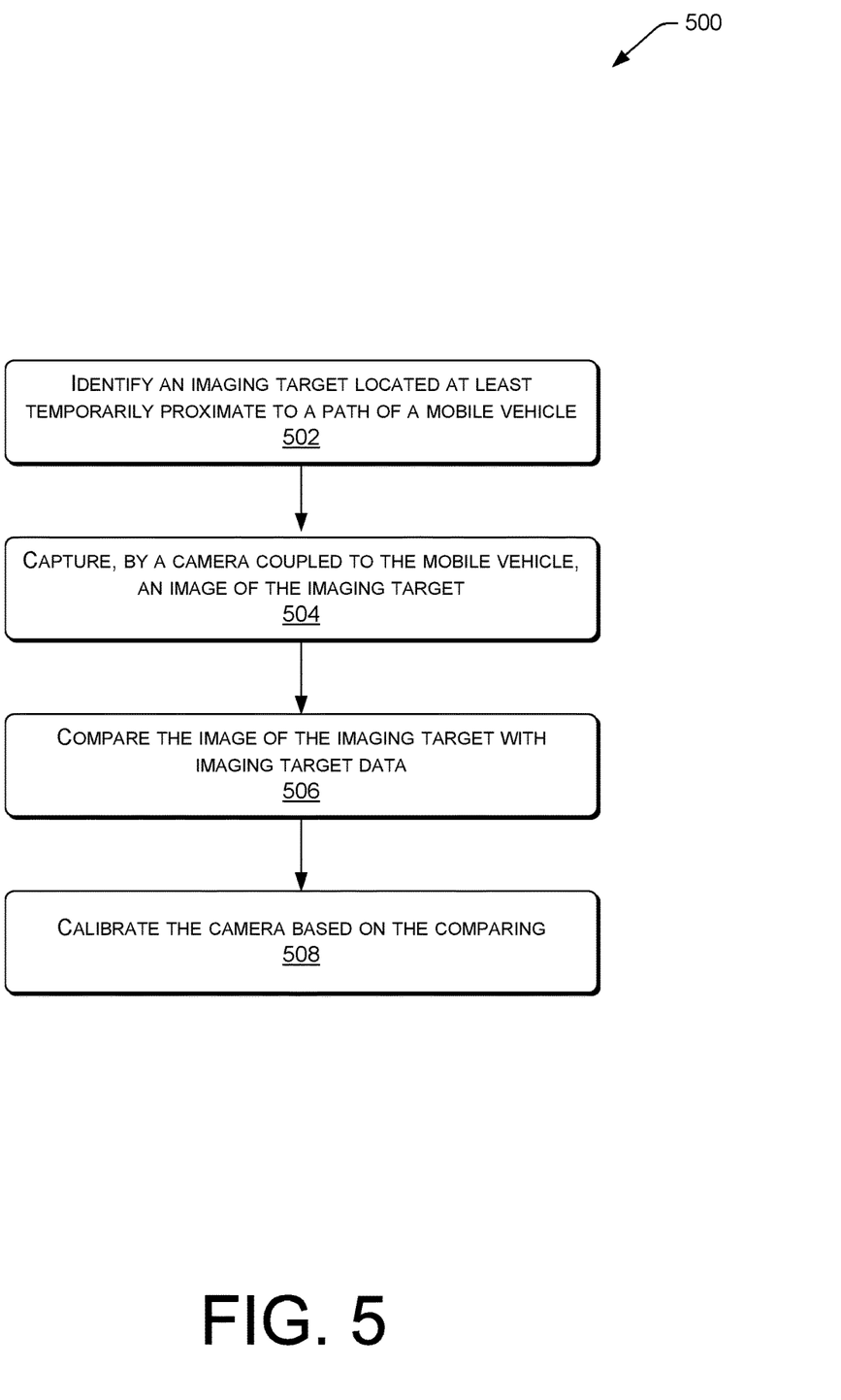
FIG. 5 is a flow diagram showing an illustrative process to calibrate one or more cameras on a mobile vehicle.

FIG. 5 is a flow diagram showing an illustrative process 500 to calibrate one or more cameras on a mobile vehicle.

At block 502, the mobile camera calibration system can identify an imaging target located at least temporarily proximate to a path of the mobile vehicle. The imaging target can be a stationary object, a mobile object, or a portion of the foregoing. For example, the imaging target can be a pattern located on a surface of the stationary or mobile object.

In various examples, the identification of the imaging target can be responsive to a determination to calibrate one or more cameras on a mobile vehicle. The determination to calibrate the one or more cameras can be based on clarity of an image captured by the camera, a scheduled calibration, a calibration opportunity, and the like.

In some examples, the identification of the imaging target can be based on a signal received from a remote computing device, another mobile vehicle, and/or a stationary object. In such examples, the signal may include location data and/or imaging target data. In various examples, the identification of the imaging target can be based on data stored in a data store of the mobile vehicle. In such examples, the data may include imaging target data for one or more imaging targets located along a flight path of the mobile vehicle. The imaging target data may include size and/or dimensions of the imaging target and/or the object associated therewith, a sample image of the imaging target, a distance and/or angle from which to capture an image of the imaging target (e.g., associated with the particular perspective), and/or other data regarding the imaging target.

At block 504, the mobile camera calibration system can cause the one or more cameras to capture an image of the imaging target. In various examples, the mobile camera calibration system can cause the one or more cameras to capture the image at a particular waypoint associated with calibration. In such examples, the particular waypoint data, such as the latitude, longitude, and altitude, can be provided by a remote computing device and/or stored in the data store of the mobile vehicle. In various examples, the mobile camera calibration system can cause the one or more cameras to capture the image at a designated distance (e.g., horizontal distance, vertical distance and/or angles) from the imaging target. In such examples, the designated distance can be measured by one or more sensors (e.g., laser range finder, etc.) of the mobile vehicle.

At block 506, the mobile camera calibration system can compare the image of the imaging target captured at 504 with the imaging target data. In various examples, the imaging target data can include a sample image of the imaging target. In such examples, the sample image may be from a known perspective (e.g., horizontal distance, vertical distance, angles, etc.) from the camera to the imaging target. In some examples, the imaging target data can include dimensions of the stationary object, the mobile object and/or the portion thereof.

At block 508, the mobile camera calibration system can calibrate the camera based on the comparison of the image with the imaging target data. The camera calibration can include an adjustment to an image center, a focal length, a scaling factor, a skew factor, a lens distortion, an image color, an image contrast, and/or other adjustments. The mobile camera calibration system can utilize any one of a plurality of known camera calibration principles to calibrate the one or more cameras, such as the principle described above with regard to FIG. 2.

Figure 6:
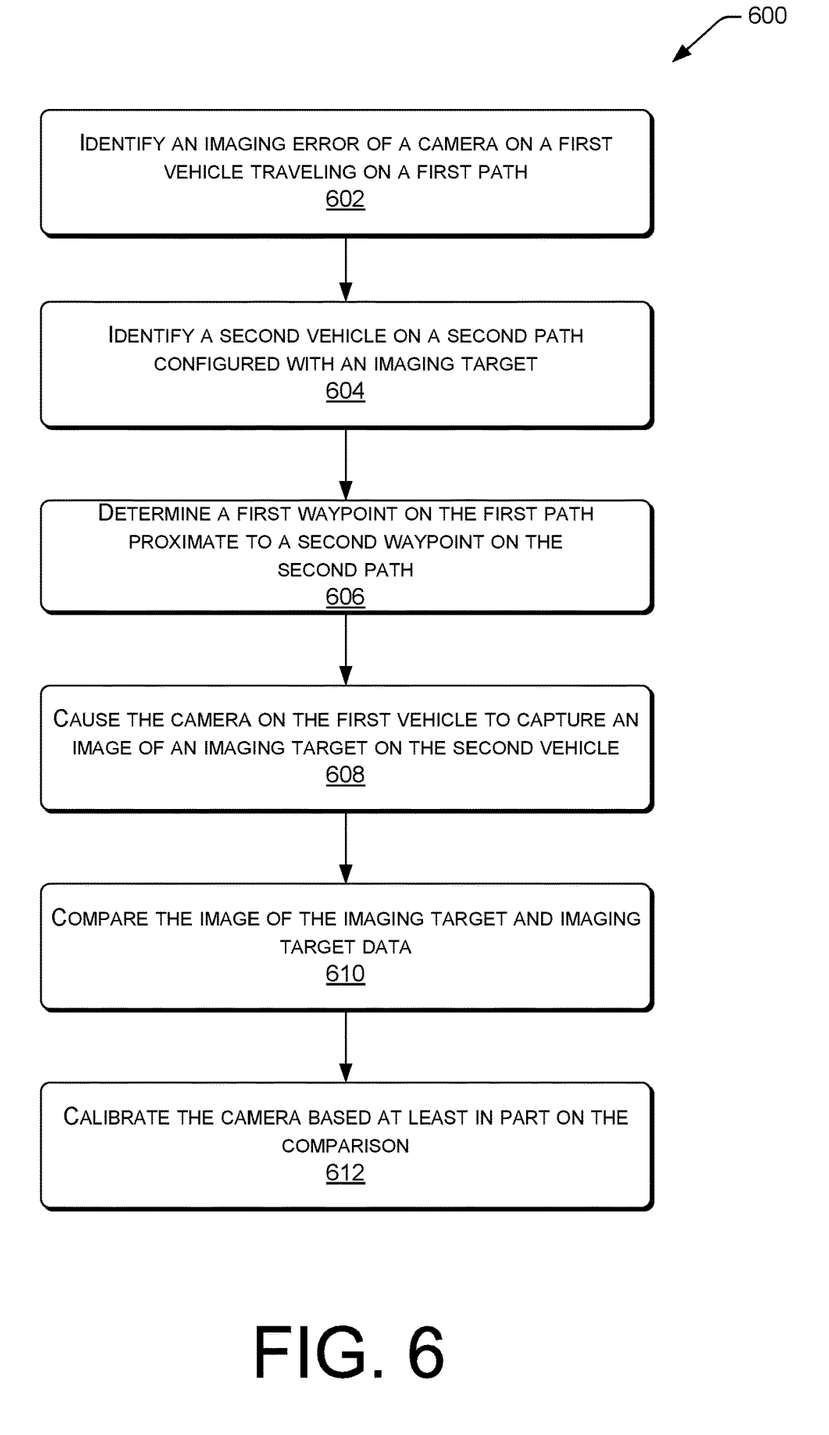
FIG. 6 is a flow diagram showing an illustrative process to calibrate one or more cameras on a mobile vehicle using an imaging target on a second mobile vehicle.

FIG. 6 is a flow diagram showing an illustrative process 600 to calibrate one or more cameras on a mobile vehicle using an imaging target on a second mobile vehicle.

At block 602, the mobile camera calibration system can identify an imaging error (e.g., positioning data, image clarity, image distortion, object distortion, etc.) of a camera on a first vehicle traveling on a first path. The imaging error can be identified by a computing system of the mobile camera calibration system, the camera itself, and/or a remote computing system. In various examples, the imaging error can be identified based on a recognition that the image and/or an object therein is blurred and/or distorted.

In various examples, the first vehicle can be a manned and/or unmanned aerial vehicle. In such examples, the first path can consist of a plurality of waypoints including a latitude, longitude, and altitude, or other three-dimensional grid system. In some examples, the first vehicle can be a (manned and/or unmanned) non-flying vehicle (e.g., an automobile, etc.). In such examples, the first path can include a plurality of two-dimensional or three-dimensional waypoints.

At block 604, mobile camera calibration system can identify a second vehicle on a second path configured with an imaging target. The second vehicle can be a manned and/or unmanned aerial or non-flying vehicle. The second path can thus include a plurality of two-dimensional and/or three-dimensional waypoints.

In various examples, the identification of the second vehicle can be based on information (e.g., flight path data, proximity information, etc.) provided by a remote computing device and/or the second vehicle. In such examples, the remote computing device and/or the second vehicle may provide the first vehicle with information based on a query for imaging target data. The query for imaging target data may be sent by the first vehicle, such as responsive to the imaging error. The imaging target data can include dimensions of the imaging target, a location of the imaging target on the second vehicle, a pattern of the imaging target, a sample image of the imaging target taken from a particular perspective (e.g., horizontal distance, vertical distance, and/or angle), and the like.

At block 606, the mobile camera calibration system can determine a first waypoint on the first path proximate to a second waypoint on the second path. In various examples, the first waypoint and the second waypoint can be based on a closest point of approach of the first vehicle and the second vehicle. In some examples, the first waypoint and the second waypoint can be based on a distance and/or angle associated with the imaging target data.

At block 608, the mobile camera calibration system can cause the camera on the first vehicle to capture an image of the imaging target on the second vehicle. In various examples, the mobile camera calibration system can cause the camera to capture the image at a particular waypoint associated with calibration. In such examples, the particular waypoint data, such as the latitude, longitude, and/or altitude, can be provided by a remote computing device and/or stored in the data store of the mobile vehicle. In various examples, the mobile camera calibration system can cause the one or more cameras to capture the image at a designated distance (e.g., horizontal distance, vertical distance, and/or angles) from the imaging target. In such examples, the designated distance can be measured by one or more sensors (e.g., laser range finder, LIDAR, etc.) of the mobile vehicle.

At block 610, the mobile camera calibration system can compare the image of the imaging target with the imaging target data. In some examples, the imaging target data can include a sample image of the imaging target. In such examples, the mobile camera calibration system can compare differences between the two images. In various examples, the imaging target data can include dimensions of the imaging target, such as dimensions of the second vehicle and/or the portion thereof (e.g., a component, a pattern located on a surface, etc.). In such examples, the mobile camera calibration system can compare the dimensions of the imaging target to the dimensions depicted in the image.

At block 612, the mobile camera calibration system can calibrate the camera based at least in part on the comparison between the image and the imaging target data. The mobile camera calibration system can utilize any one of a plurality of known camera calibration principles to calibrate the one or more cameras, such as the principle described above with regard to FIG. 2.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more memory components coupled to the one or more processors, the one or more memory components storing instructions executable by the one or more processors to perform acts comprising:
  sending a query to identify one or more imaging targets in proximity to a path of a first mobile vehicle;
  receiving a notification that a second mobile vehicle comprising an imaging target is proximate to the path;
  determining that the second mobile vehicle is within a threshold distance of the first mobile vehicle at a first waypoint on the path;
  accessing a reference image that depicts at least a portion of the imaging target;
  determining an angle associated with a perspective view of the imaging target depicted in the reference image with respect to the first mobile vehicle;
  orienting a camera coupled to the first mobile vehicle based at least in part on the angle associated with the perspective view of the imaging target in the reference image;
  after orienting the camera, causing the camera to capture an image of at least the imaging target with the first mobile vehicle at the first waypoint;
  comparing the imaging target depicted in the image to the imaging target depicted in the reference image; and
  calibrating the camera based at least in part on a difference between the imaging target depicted in the image and the imaging target depicted in the reference image.

2. The system of claim 1, wherein the acts further comprise:
receiving angular information from a sensor of the first mobile vehicle; and
determining that the second mobile vehicle is approximately at the angle associated with the perspective view of the imaging target depicted in the reference image based at least in part on the angular information,
wherein the camera is caused to capture the image of at least the imaging target in response to determining that the second mobile vehicle is approximately at the angle.

3. The system of claim 1, wherein calibrating the camera comprises adjusting at least one of:
an image center;
a focal length;
a scaling factor;
a skew factor;
a lens distortion;
an image color; or
an image contrast.

4. A first unmanned aerial vehicle (UAV) comprising:
an airframe;
a camera coupled to the airframe;
one or more processors; and
one or more memory components having one or more sets of instructions executable by the one or more processors stored thereon,
wherein the one or more sets of instructions, when executed by the one or more processors, cause the one or more processors to at least:
  send a query to identify one or more imaging targets for calibrating the camera in proximity to a path of the first UAV;
  receive a notification that a second UAV comprising an imaging target is in proximity to the path of the first UAV;
  identify an imaging target for calibration of the camera;
  access imaging target data associated with at least one reference image of at least the imaging target, wherein the imaging target data comprises an angle associated with a perspective view of the imaging target depicted in the at least one reference image with respect to the camera;
  orient the camera based at least in part on the angle;
  determine that the second UAV is within a threshold distance of the first UAV at a first waypoint on the path;
  capture, by the camera, at least one image of the imaging target, wherein the at least one image is captured with the first UAV at the first waypoint and with the camera oriented based at least in part on the angle;
  determine a comparison of the at least one image to the imaging target data; and
  calibrate the camera based at least in part on the comparison of the at least one image to the imaging target data.

5. The first UAV of claim 4, wherein the camera comprises a stereo pair of lenses, and
wherein the capture of the at least one image of the imaging target comprises:
  capture of a first image through a first lens of the stereo pair of lenses and a second image through a second lens of the stereo pair of lenses, and
  wherein the camera is calibrated based at least in part on the comparison of the first image to the imaging target data and the second image to the imaging target data.

6. The first UAV of claim 4, wherein the one or more sets of instructions, when executed, further cause the one or more processors to at least:
identify a waypoint on the path that corresponds to the angle associated with the perspective view of the imaging target depicted in the at least one reference image,
wherein the first waypoint is the waypoint on the path that corresponds to the angle.

7. The first UAV of claim 4, wherein the camera comprises a stereo pair of cameras, and
wherein the camera is calibrated based at least in part on:
  a comparison between a first image captured by a first camera of the stereo pair of cameras and a first reference image of the imaging target data; and
  a comparison between a second image captured by a second camera of the stereo pair of cameras and a second reference image of the imaging target data.

8. The first UAV of claim 4, wherein the camera is calibrated by an adjustment to at least one of:
an image center;

a focal length;
a scaling factor;
a skew factor;
a lens distortion;
an image color; or
an image contrast.

9. The first UAV of claim 4, wherein the imaging target data comprises one or more reference images of the imaging target,
wherein individual reference images of the one or more reference images comprise perspective views of the imaging target, and
wherein the one or more sets of instructions, when executed, further cause the one or more processors to at least:
capture one or more images of the imaging target, wherein each of the one or more images is captured from one or more same or similar perspective views of the one or more reference images, and wherein the one or more images comprise the at least one image; and
determine comparisons of the one or more images to the one or more reference images,
wherein the camera is calibrated based at least in part on the comparisons of the one or more images to the one or more reference images.

10. The first UAV of claim 4, wherein the one or more sets of instructions, when executed, further cause the one or more processors to at least:
receive the imaging target data from at least one of:
a stationary object;
the second UAV;
a third UAV; or
a remote computing system.

11. The first UAV of claim 4, wherein the imaging target comprises at least one of:
a component of a second UAV; or
a pattern located on a surface of the second UAV.

12. The first UAV of claim 4, wherein the one or more sets of instructions, when executed, further cause the one or more processors to at least:
determine to calibrate the camera based at least in part on one or more of:
a clarity of an image captured by the camera;
an elapsed time since a previous calibration;
a location of the camera;
a disturbance to the camera; or
an error report generated by the camera.

13. A method comprising:
sending a query to identify one or more imaging targets in proximity to a path of a first mobile vehicle;
receiving a notification that a second mobile vehicle comprising an imaging target is located at least temporarily proximate to the path of a first mobile vehicle;
identifying a reference image of the imaging target;
determining imaging target data corresponding to the imaging target, wherein the imaging target data comprises an angle associated with a perspective view of the imaging target in the reference image with respect to a camera coupled to the first mobile vehicle;
orienting the camera based at least in part on the angle;
determining that the second mobile vehicle is within a threshold distance of the first mobile vehicle at a first waypoint on the path;
capturing, by the camera, at least a first image of the imaging target with the first mobile vehicle at the first waypoint, wherein at least the first image is captured with the camera oriented based at least in part on the angle associated with the perspective view of the imaging target in the reference image;
comparing the first image to the imaging target data; and
calibrating the camera based on a comparison of the first image to the imaging target data.

14. The method of claim 13, further comprising:
receiving the imaging target data corresponding to the imaging target in response to the query,
wherein the imaging target data comprises at least one dimension of the imaging target.

15. The method of claim 13, wherein determining the imaging target data comprises:
receiving the imaging target data from at least one of:
a stationary object;
the second mobile vehicle;
a third mobile vehicle; or
a remote computing system.

16. The method of claim 13, wherein the camera comprises a stereo pair of lenses, and
wherein capturing at least the first image of the imaging target comprises:
capturing the first image through a first lens; and
capturing a second image through a second lens,
wherein the comparing the at least one image to the imaging target data comprises:
comparing the first image to the imaging target data; and
comparing the second image to the imaging target data.

17. The method of claim 13, further comprising:
prior to sending the query,
capturing, by the camera, a second image;
determining that the second image comprises an imaging error; and
determining to calibrate the camera based at least in part on the imaging error,
wherein the query is sent in response to determining to calibrate the camera.

18. The method of claim 13, further comprising:
receiving, from a sensor of the first mobile vehicle, information regarding an angle from the first mobile vehicle to the imaging target; and
determining that the mobile vehicle is approximately at a location corresponding to the angle associated with the perspective view of the imaging target in the reference image based at least in part on the information regarding the angle from the first mobile vehicle to the imaging target,
wherein at least the first image of the imaging target is captured in response to determining that the first mobile vehicle is approximately at the location corresponding to the angle.

* * * * *